United States Patent [19]

Montgomery

[11] 4,286,183
[45] Aug. 25, 1981

[54] DYNAMOELECTRIC MACHINE

[75] Inventor: Lon W. Montgomery, Monroeville, Pa.

[73] Assignee: Westinghouse Electric Corp., Pittsburgh, Pa.

[21] Appl. No.: 778,528

[22] Filed: Mar. 17, 1977

[51] Int. Cl.³ .............................................. H02K 9/00
[52] U.S. Cl. ...................................... 310/62; 310/58; 310/61; 310/260
[58] Field of Search ....................... 310/52, 62, 58, 63, 310/59, 64, 61, 65, 197, 182, 183, 211, 261, 264, 260, 270

[56] References Cited

U.S. PATENT DOCUMENTS

| 2,427,731 | 9/1947 | Lynn | 310/58 |
|---|---|---|---|
| 3,517,232 | 6/1970 | Sano | 310/59 |
| 3,716,732 | 2/1973 | Tillma | 310/61 |
| 3,932,778 | 1/1976 | Watanbe | 310/61 |
| 3,969,643 | 7/1976 | Sapper | 310/58 |

Primary Examiner—R. Skudy
Attorney, Agent, or Firm—F. J. Baehr, Jr.

[57] ABSTRACT

Forming the blower assemblies on a large squirrel cage induction motor of non-metallic steel reduces short circuiting ring temperature hot spots and temperature differentials experienced during motor startup.

4 Claims, 4 Drawing Figures

FIG.2
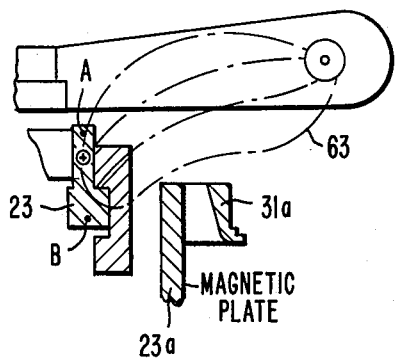
FIG.3
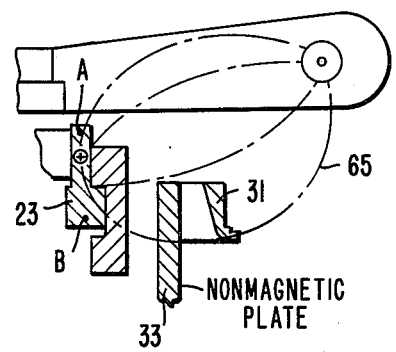
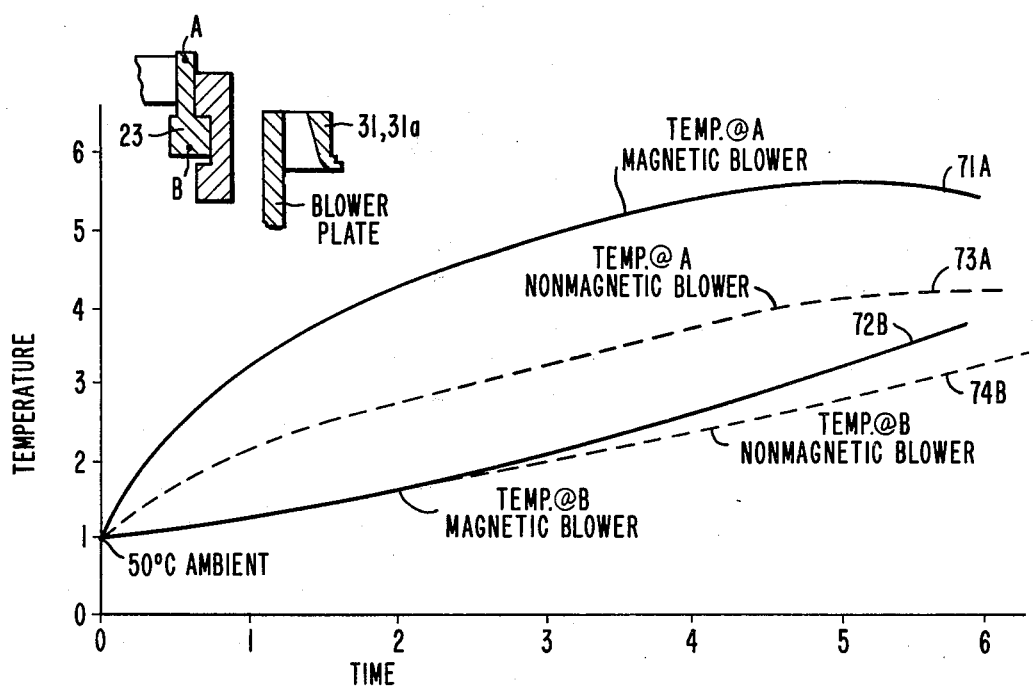
FIG.4

DYNAMOELECTRIC MACHINE

BACKGROUND OF THE INVENTION

This invention relates to large squirrel cage induction motors and more particularly to such motors having blower assemblies disposed adjacent each end of the rotor.

Large squirrel cage induction motors have rotors in the range of 40 inches in diameter and fan assemblies with end plates which approach this diameter. Due to the large diameter and the high rotating speeds up to 3,600 rpm, the end plates of the blowers are normally made of carbon steel which is relatively inexpensive and has sufficient tensile and creep strength and high modulus of elasticity to perform satisfactorily from a mechanical viewpoint.

SUMMARY OF THE INVENTION

A dynamoelectric machine, when made in accordance with this invention, has a stator; a rotor; a shaft rotatably mounted within the stator and forming a core for the rotor; a spider extending radially outwardly from the shaft; a plurality of rotor laminations encircling the spider, the rotor laminations being arranged in groups with a space between groups and the rotor laminations having a plurality of notches adjacent their outer periphery, the notches being aligned to form axial grooves; rotor bars disposed in the axial grooves in the rotor laminations; short circuiting rings disposed on the ends of the bars for electrically connecting the ends thereof; fan assemblies, one on each end of the shaft disposed outboard and adjacent the short circuiting rings, the fan assemblies being made of non-magnetic material; a plurality of stator laminations disposed to encircle the rotor, the stator laminations being disposed in groups with a space between groups, the stator laminations having an inner margin with a plurality of aligned notches disposed adjacent thereto, to form axial grooves in the stator laminations; and conductive windings disposed in the axial grooves in the stator laminations, the windings having end turns which are formed as the windings leave one axial groove in the laminations and return to another such groove, the end turns extending axially outwardly beyond the short circuiting rings and the fan assemblies, whereby when operating the isopotential lines normal to the magnetic field in the regions of the machine are more evenly distributed resulting in lower losses and reduced temperature differences in the short circuiting rings.

BRIEF DESCRIPTION OF THE DRAWINGS

The objects and advantages of this invention will become more apparent from reading the following detail description in connection with the accompanying drawings, in which:

FIG. 2 is a partial sectional view showing isopotential lines drawn between the peripheral current in the stator end turns and the short peripheral current in the rotor short circuiting ring of a motor with magnetic fan end plates;

FIG. 3 is a partial sectional view showing the isopotential lines drawn between the peripheral current in the stator end turns and the peripheral current in the rotor short circuiting ring of a motor made in accordance with this invention; and FIG. 4 is a curve of the short circuiting ring temperatures versus time during the startup of a typical four pole motor with a magnetic blower end plate and with a non-magnetic blower end plate.

DESCRIPTION OF THE PREFERRED EMBODIMENT

Figure 1:
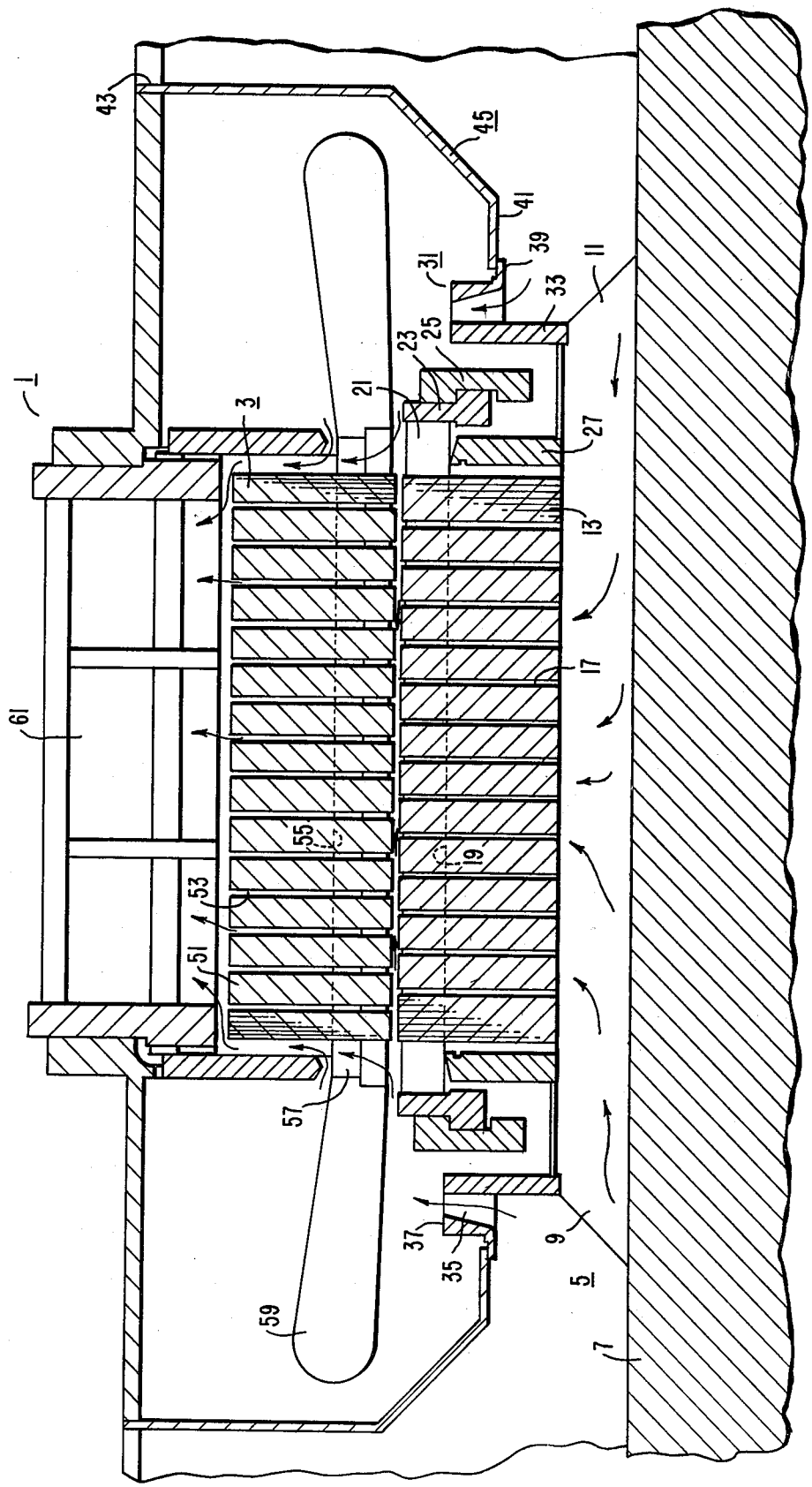
FIG. 1 is a sectional view of a motor made in accordance with this invention.

Referring now to the drawings in detail and in particular to FIG. 1, there is shown a large squirrel cage induction motor or dynamoelectric machine 1 comprising a stator 3 and a rotor 5 rotatably disposed within the stator 3.

The rotor 5 comprises a shaft 7 forming the core thereof and having a spider 9 extending radially outwardly from the central portion thereof. The spider 9 comprises a plurality of flat bars 11 which are longitudinally aligned with the axis of the shaft 7 and extend radially therefrom providing a paddle wheel like arrangement and in this embodiment are integral with the shaft.

A plurality of rotor laminations 13 encircle the spider 9, firmly contacting the outer edges of the flat bars 11. The rotor laminations 13 are disposed in groups with a ventilation space 17 between the groups and have aligned notches 19 adjacent the other periphery forming axial longitudinal grooves.

Conductive bars or rotor bars 21 are disposed in the axial grooves formed by the notches 19. The rotor bars 21 extend beyond each end of the laminations 13 and a resistance ring or short circuiting ring 23 is electrically connected to each end of each rotor bar 21. A shrink ring or retainer ring 25 is shrunk on the short circuiting rings 23 and is further attached thereto by cap screws or other fastening means (not shown).

Annular rotor end plates 27 are spaced from the ends of the rotor laminations 13.

A fan or blower assembly 31 fabricated from a non-magnetic material such as austenitic stainless steel or other non-magnetic material having high strength generally above 22,000 psi yield strength and high modulus of elasticity generally above $23 \times 10^6$ is disposed adjacent the short circuiting and retainer rings 23 and 25. The blower assembly 31 comprises an annular end plate 33 which fits over the spider 9 and is attached thereto. A plurality of vanes 35 are disposed perpendicular to the end plate 33 adjacent the outer periphery thereof. An annular wedge-shaped seal ring 37 is fastened to the vanes forming a diverging flow path with the end plates 33. The seal ring 37 has a circumferential ledge 39 extending generally perpendicular from the inner margin thereof.

A circumferential seal strip 41 is disposed over the spider between the end rotor plate 27 and the blower end plate 33 forming a seal therebetween.

A cooling air inlet 43 is disposed in each end of the stator 3 and a frustoconical flow guide 45 cooperates with the seal strip 41 to direct air into the blower assembly and into each end of the spider in order to cool the motor.

The stator 3 comprises a plurality of stator laminations 51 disposed in groups with a ventilation space 53 between the groups. The stator laminations 51 are annular plates disposed to encircle the rotor 5 in such a way that the ventilation spaces 53 between the stator laminations 51 are generally one-half pitch out of phase with the spaces 17 between the rotor laminations 13 allowing air to flow from the spider through the rotor and through the stator.

The stator laminations 51 have a plurality of aligned notches 55 disposed along the inner margin of the stator laminations 51 to form a plurality of axially disposed grooves longitudinally extending through the stator laminations 51.

Conductive windings 57 are disposed in the grooves formed by the notches 55. The windings 57 have end turns 59 which are formed as the windings 57 leave one groove and return to another groove. The end turns 59 extend axially and outwardly beyond the short circuiting rings 23 and the blower assemblies 31. An exhaust or air outlet 61 is disposed in the stator 3 adjacent the stator laminations 51.

Cooling air which is directed to the blower 31 is picked up by the blower and discharged across the end turns 59 which cool the end turns while other cooling air which is directed to the spider flows through the ventilation spaces 17 between the rotor laminations 13 and then outwardly through the ventilation spaces 53 between the stator laminations 51 cooling the motor 1.

FIG. 2 shows a blower assembly 31a made from a magnetic material such as carbon steel. While such construction is low cost, as shown in FIG. 2 the isopotential lines 63 are disturbed by the blower end plate 33a crowding the lines and causing locally high currents in the short circuiting ring 23 which produce excessive local $I^2R$ losses and hot spots within the short circuiting ring 23. FIG. 3 shows the blower assembly 31 formed from non-magnetic material such as austenitic stainless steel which is generally non-magnetic unless subjected to severe cold-working. The isopotential lines 65 shown in FIG. 3 are much more evenly distributed, greatly reducing the current densities in certain areas of the short circuiting ring 23 reducing hot spots and temperature differentials in the short circuiting ring 23.

FIG. 4 shows temperature versus time curves during startup at two points A and B on the short circuiting ring 23 with magnetic blower assemblies indicated by the solid lines 71A and 72B and at two points A and B on the short circuiting ring 23 with non-magnetic blower assembly indicated by the solid lines 73A and 74B. The curves represent temperature versus time for points A and B during the startup period which for the representative example calculation lasts approximately 60 seconds. Temperature and time are indicated on the vertical and horizontal axis, respectively.

What is claimed is:

1. A dynamoelectric machine having
a stator;
a rotor;
a shaft rotatably mounted within the stator and forming a core for the rotor;
a spider extending radially outwardly from the shaft;
a plurality of rotor laminations encircling the spider, the rotor laminations being arranged in groups with a space between groups and the rotor laminations having a plurality of notches adjacent their outer periphery, the notches being aligned to form axial grooves;
rotor bars disposed in the axial grooves in the rotor laminations;
short circuiting rings disposed on the ends of the rotor bars for electrically connecting the ends thereof;
fan assemblies, one on each end of the shaft disposed outboard and adjacent the short circuiting rings, the fan assemblies being made of austenitic stainless steel;
a plurality of stator laminations disposed to encircle the rotor, the stator laminations being disposed in groups with a space between groups, the stator laminations having an inner margin with a plurality of aligned notches disposed adjacent thereto to form axial grooves in the stator laminations; and
conductive windings disposed in the axial grooves in the stator laminations, the windings having turns which are formed, as the windings, leave one axial groove in the stator and return to another such groove, the end turns extending axially and outwardly beyond the short circuiting rings and the fan assemblies;
whereby when operating the isopotential lines normal to the magnetic field in the end region of the machine are more evenly distributed resulting in lower losses and reduced temperature differentials in the short circuiting rings.

2. A dynamoelectric machine as set forth in claim 1 and further comprising an air inlet on each end of the stator, an air outlet in the stator and baffles disposed in the stator for directing air from the inlets to the fan assembly and to the spider whereby a portion of the air is directed to the fan assembly which blows it over the end windings and another portion is directed through the spider, through the spaces between the group of rotor laminations, and then through the spaces between the stator laminations to the air outlet, thus providing cooling for the rotor, stator, and end turns.

3. A dynamoelectric machine having a stator;
a rotor;
a shaft rotatably mounted within the stator and forming a core for the rotor
a plurality of rotor laminations encircling the rotor;
the rotor laminations having a plurality of notches disposed adjacent the outer periphery of the rotor laminations, the notches being aligned to form axial grooves;
rotor bars disposed in the axial grooves in the rotor laminations;
short circuiting rings disposed on the ends of the rotor bars for electrically connecting the ends thereof;
fan assemblies, one on each end of the shaft disposed outboard and adjacent the short circuiting rings, the fan assemblies being made of a non-magnetic material having a yield stress generally above 22,000 psi and a modulus of elasticity generally above $23 \times 10^6$;
a plurality of stator laminations disposed to encircle the rotor;
the stator laminations having an inner margin with a plurality of aligned notches disposed adjacent thereto to form axial grooves in the stator laminations;
conductive windings disposed in the axial grooves in the stator laminations, the windings having turns which are formed, as the windings, leave one axial groove in the stator and return to another such groove;
the end turns extending axially outwardly beyond the short circuiting rings and the fan assemblies;
whereby when operating the isopotential lines normal to the magnetic field in the end region of the machine are more evenly distributed resulting in lower losses and reduced temperature differentials in the short circuiting rings.

4. A dynamoelectric machine as set forth in claim 3, wherein the fan assembly is made of austenitic stainless steel.

* * * * *

UNITED STATES PATENT AND TRADEMARK OFFICE
CERTIFICATE OF CORRECTION

PATENT NO. : 4,286,183
DATED : August 25, 1981
INVENTOR(S) : Lon W. Montgomery

It is certified that error appears in the above—identified patent and that said Letters Patent is hereby corrected as shown below:

In the Abstract, "non-metallic" should read -- non-magnetic --.

Signed and Sealed this

Ninth Day of March 1982

[SEAL]

Attest:

GERALD J. MOSSINGHOFF

*Attesting Officer*  *Commissioner of Patents and Trademarks*